(12) United States Patent
Seleznev et al.

(10) Patent No.: US 11,707,781 B2
(45) Date of Patent: Jul. 25, 2023

(54) METHODS OF INCREASING DENSITY OF 3D-PRINTED AND SINTERED PARTS

(71) Applicant: MARKFORGED, INC., Watertown, MA (US)

(72) Inventors: Maxim Seleznev, Belmont, MA (US); Joseph Roy-Mayhew, Watertown, MA (US)

(73) Assignee: MARKFORGED, INC., Waltham, MA (US)

( * ) Notice: Subject to any disclaimer, the term of this patent is extended or adjusted under 35 U.S.C. 154(b) by 82 days.

(21) Appl. No.: 16/999,313

(22) Filed: Aug. 21, 2020

(65) Prior Publication Data

US 2021/0053116 A1 Feb. 25, 2021

Related U.S. Application Data (60) Provisional application No. 62/891,027, filed on Aug. 23, 2019.

(51) Int. Cl.
  *B22F 1/05* (2022.01)
  *B22F 3/10* (2006.01)
  (Continued)

(52) U.S. Cl.
  CPC .............. *B22F 1/05* (2022.01); *B22F 3/1003* (2013.01); *B22F 5/08* (2013.01); *B22F 10/00* (2021.01);
  (Continued)

(58) Field of Classification Search
  None
  See application file for complete search history.

(56) References Cited

U.S. PATENT DOCUMENTS

| 2002/0176793 A1* | 11/2002 | Moussa ................ G03F 7/0047 419/10 |
| 2006/0045787 A1* | 3/2006 | Jandeska, Jr. ......... B33Y 10/00 419/47 |

(Continued)

OTHER PUBLICATIONS

Aneta Szewczyk-Nykiel "The Effect of the Addition of Boron on the Densification, Microstructure and Properties of Sintered 17-4 Ph Stainless Steel" Technical Transactions, Mechanics, 2-M, 2014, pp. 85-96.

Ch. Gierl, et al. "Boron Activated Sintering of PM Steels—Alternative Boron Sources", Powder Metallurgy Progress, vol. 8 (2008), No. 2 135, pp. 135-141.

(Continued)

*Primary Examiner* — Elizabeth Collister
(74) *Attorney, Agent, or Firm* — Lando & Anastasi, LLP (57) ABSTRACT

A material for producing a three-dimensionally printed part including a metal material and at least one sintering aid in an amount effective to give the three-dimensionally printed part a density of between about 90% and about 100% after sintering is disclosed. A method of printing a three-dimensional part including selecting a metal material, incorporating at least one sintering aid into the metal material to form a print material, and printing the three-dimensional part is also disclosed. A method of producing a sintered metal part including providing a metal material for the sintered metal part incorporating boron as a first sintering aid, incorporating phosphorus as a second sintering aid, forming the metal part in a predetermined form the metal material, and heating the formed metal part to a sintering temperature is also disclosed. Three-dimensionally printed parts are also disclosed.

20 Claims, 5 Drawing Sheets

(51) Int. Cl.
  *B33Y 10/00*   (2015.01)
  *B33Y 80/00*   (2015.01)
  *B22F 10/00*   (2021.01)
  *B33Y 70/00*   (2020.01)
  *B22F 1/10*    (2022.01)
  *B22F 5/08*    (2006.01)

(52) U.S. Cl.
  CPC .............. *B33Y 10/00* (2014.12); *B33Y 80/00* (2014.12); *B22F 1/10* (2022.01); *B22F 2301/35* (2013.01); *B33Y 70/00* (2014.12)

(56) References Cited

U.S. PATENT DOCUMENTS

| | | | | |
|---|---|---|---|---|
| 2015/0069649 | A1* | 3/2015 | Bai | B28B 1/001 264/129 |
| 2015/0080495 | A1* | 3/2015 | Heikkila | B22F 5/12 264/642 |
| 2015/0125334 | A1* | 5/2015 | Uetani | B22F 10/10 419/36 |
| 2016/0236412 | A1* | 8/2016 | Kusahara | B22F 10/10 |
| 2017/0348770 | A1* | 12/2017 | Kwon | C22C 38/00 |
| 2018/0154437 | A1* | 6/2018 | Mark | B33Y 10/00 |

OTHER PUBLICATIONS

H. O. Gulsoy, et al., "Sintering of a Boron-Doped Injection Moulded 17-4PH Stanless Steel", Journal of Materials Science Letters, v40 (2005) pp. 4101-4104.

H.I. Bakan et al., "Effect of Nickel Boride and Boron Additions on Sintering Characteristics of Injection Moulded 316L powder using water soluble binder system". Powder Metallurgy, vol. 44 (2001), No. 3, p. 235-242.

Herbert Danninger, et al. "Embrittling Components in Sintered Steels: Comparison of Phosphorus and Boron", Powder Metallurgy Progress, vol. 17 (2017), No. 1, p. 047-064.

Herbert Danninger, et al., "Combined Thermal and Chemical Analysis for Studying the Reactions of P Carriers in Ferrous Compacts", Proceedings of Euro PM2018 Conference, Bilbao, Spain, Oct. 2018.

J.A. Cabral Miramontes, et.al. "Effect of Boron Additions on Sintering and Densification of a Ferritic Stainless Steel", Journal of Materials Engineering and Performance, vol. 19(6) Aug. 2010, pp. 880-884.

M. Selecká, et al. "The effect of boron liquid phase sintering on properties of Ni-, Mo- and Cr-alloyed structural steels", Journal of Materials Processing Technology, 143-144 (2003), pp. 910-915.

V. Vassileva, H., et al., "The Role of the Atmosphere on Boron-Activated Sintering of Ferrous Powder Compacts", Powder Metallurgy Progress, vol. 18 (2018), No. 1, p. 006-020.

* cited by examiner

METHODS OF INCREASING DENSITY OF 3D-PRINTED AND SINTERED PARTS

CROSS-REFERENCE TO RELATED APPLICATIONS

This application claims priority under 35 U.S.C. § 119(e) to U.S. Provisional Patent Application No. 62/891,027 titled "Methods of Increasing Density of 3D-Printed and Sintered Parts" filed Aug. 23, 2019, the entire disclosure of which is herein incorporated by reference in its entirety for all purposes.

FIELD OF TECHNOLOGY

One or more aspects of the disclosure relate generally to 3D-printing materials and to methods of preparing 3D-printed parts having increased density.

BACKGROUND

Additive manufacturing, or three-dimensional (3D) printing, includes various methods for producing 3D parts. Typically, 3D printing refers to the direct fabrication of physical products from a 3D computer model by a layered manufacturing process. In 3D printing, three dimensional articles may be fabricated from print material in the form of plastic, metal, ceramic, or combination materials. However, metal and ceramic articles produced by 3D printing are often porous and brittle. There is a need in the art for improved methods of decreasing porosity and increasing density of 3D printed metal and ceramic articles.

Conventional approaches for increasing the density of 3D-printed metal and ceramic parts typically include increasing sintering temperature and time, decreasing metal powder size used for 3D printing, subjecting printed parts to a hot isostatic pressing (HIPing) operation, or a combination thereof. These methods have drawbacks, such as greater energy consumption, reduced lifespan of system components, and greater cost of specialized systems and materials. Thus, implementation of these conventional methods may be costly.

Sintering is a process of coalescing a mass of material by application of heat and/or pressure, typically without melting the material to the point of liquefaction. Sintering may be employed for the formation of metal, ceramic, plastic, and other materials. However, sintering of conventional metal and ceramic 3D print material may also produce 3D parts which are porous and brittle. Improvements to the sintering technology of 3D printed parts may produce metal and ceramic parts having a reduced volume of pores and an increased density, without incurring the greater costs of other density-increasing methods.

SUMMARY

In accordance with one aspect, there is provided a material for producing a three-dimensionally printed part. The material may comprise a metal material. The material may comprise at least one sintering aid in an amount effective to give the three-dimensionally printed part a density of between about 90% and about 100% after sintering.

In certain embodiments, the metal material may be in the form of a powderized metal material in a powder bed. The material for producing the three-dimensionally printed part may further comprise a binding agent.

In some embodiments, the at least one sintering aid may be in the form of a powderized sintering aid incorporated into the powder bed.

The powder bed of the metal material may have a particle size distribution with 90% of particles having a diameter of less than about 50 µm.

The powder bed of the metal material may have a particle size distribution with 90% of particles having a diameter of less than about 18 µm.

In some embodiments, the metal material may comprise a filament and the at least one sintering aid is incorporated in the filament.

The at least one sintering aid may comprise boron.
The at least one sintering aid may comprise phosphorous.
The at least one sintering aid may comprise silicon.

The material may comprise boron as a first sintering aid in an amount from about 0 wt % to about 0.4 wt % based on a weight of metal components of the metal material and phosphorus as a second sintering aid in an amount from about 0 wt % to about 1 wt % based on the weight of the metal components of the metal material.

In some embodiments, if the amount of boron is at least 0.1 wt % the amount of phosphorus is 0 wt %.

In some embodiments, if the amount of boron is at least 0.03 wt % the amount of phosphorus is 0 wt %.

The metal material may be stainless steel.
The metal material may be tool steel.

In another aspect, there is provided a three-dimensionally printed part formed of sequential layers of a material for producing the three-dimensionally printed part disclosed herein arranged in a predetermined form.

In accordance with another aspect, there is provided an ink for binding sequential layers of metal material in a three-dimensionally printed part. The ink may comprise a binding agent and at least one sintering aid in an amount effective to give the three-dimensionally printed part a density of between about 90% and about 100% after sintering.

The ink may comprise the at least one sintering aid in an amount effective to give the three-dimensionally printed part a density of between about 95% and about 100% after sintering.

The at least one sintering aid may comprise boron.
The at least one sintering aid may comprise phosphorous.
The at least one sintering aid may comprise silicon.

In accordance with another aspect, there is provided a method of printing a three-dimensional part. The method may comprise selecting a metal material for the three-dimensional part. The method may comprise incorporating at least one sintering aid into the metal material. The at least one sintering aid may be incorporated in an amount effective to give the three-dimensional part a density of between about 90% and about 100% after sintering to form a print material. The method may comprise printing the three-dimensional part by forming sequential layers of the print material in a predetermined form.

In some embodiments, the method may comprise heating the printed three-dimensional part to a sintering temperature for a predetermined amount of time to form a sintered three-dimensional part.

The at least one sintering aid may be incorporated as a powderied sintering aid into a powder bed.

The at least one sintering aid may be incorporated into an ink comprising a binding agent.

The at least one sintering aid may be incorporated into a filament formed from the metal material.

The metal material may comprise a powder bed having powderized part material.

Forming sequential layers may comprise depositing a binding agent onto the powderized part material.

In some embodiments, incorporating the at least one sintering aid may comprise incorporating the at least one powderized sintering aid into the powder bed.

In some embodiments, incorporating the at least one sintering aid may comprise incorporating the at least one sintering aid into an ink comprising the binding agent.

In some embodiments, the metal material may comprise a filament. Incorporating the at least one sintering aid may comprise forming the filament from the metal material including the at least one sintering aid.

Incorporating the at least one sintering aid may comprise incorporating the at least one sintering aid in an amount effective to give the three-dimensional part a density of between about 95% and about 100% after sintering.

In certain embodiments, the at least one sintering aid may comprise boron.

The at least one sintering aid may comprise phosphorous.

The at least one sintering aid may comprise silicon.

The method may comprise selecting the metal material to be stainless steel print material.

The method may comprise selecting the metal material to be tool steel print material.

In certain embodiments, the metal material may be stainless steel print material. In such embodiments, the method may further comprise incorporating boron as a first sintering aid in an amount from about 0 wt % to about 0.4 wt % based on a weight of metal components of the metal material. The method may further comprise incorporating phosphorus as a second sintering aid in an amount from about 0 wt % to about 1 wt % based on the weight of the metal components of the metal material. In such embodiments, if the amount of boron is at least 0.1 wt %, the amount of phosphorous may be 0 wt %.

In other embodiments, the metal material may be tool steel print material. In such embodiments, the method may further comprise incorporating boron as a first sintering aid in an amount from about 0 wt % to about 0.4 wt % based on a weight of metal components of the metal material. The method may comprise incorporating phosphorus as a second sintering aid in an amount from about 0 wt % to about 1 wt % based on the weight of the metal components of the metal material. In such embodiments, if the amount of boron is at least 0.03 wt %, the amount of phosphorous may be 0 wt %.

In some embodiments, a powder bed of the metal material may have a particle size distribution with 90% of particles having a diameter of less than about 50 μm.

In some embodiments, a powder bed of the metal material may have a particle size distribution with 90% of particles having a diameter of less than about 18 μm.

In some embodiments, a powder bed of the metal material may have a particle size distribution with 90% of particles having a diameter of less than about 12 μm.

In some embodiments, a raw powderized metal of the metal material has a particle size distribution with 90% of particles having a diameter of less than about 50 μm.

In some embodiments, a raw powderized metal of the metal material has a particle size distribution with 90% of particles having a diameter of less than about 18 μm.

In some embodiments, a raw powderized metal of the metal material has a particle size distribution with 90% of particles having a diameter of less than about 12 μm.

The sintering temperature may be below 1250° C. The predetermined time may be between about 1 hour and about 10 hours.

The sintering temperature may be between about 1200° C. and about 1400° C. The predetermined time may be between about 1 hour and about 7 hours.

In accordance with another aspect, there is provided a three-dimensionally printed part produced by the methods disclosed herein.

In accordance with another aspect, there is provided a method of producing a sintered metal part. The method may comprise providing a metal material for the sintered metal part. The method may comprise incorporating boron as a first sintering aid into the metal material in an amount from about 0 wt % to about 0.4 wt % based on a weight of metal components of the metal material. The method may comprise incorporating phosphorus as a second sintering aid into the metal material in an amount from about 0 wt % to about 1 wt % based on the weight of the metal components of the metal material. If the amount of boron is at least 0.1 wt % the amount of phosphorus may be 0 wt %. The method may comprise forming the metal part in a predetermined form from the metal material. The method may comprise heating the formed metal part to a sintering temperature for a predetermined amount of time to form a sintered metal part.

The metal material may comprise stainless steel.

In some embodiments, if the amount of boron is at least 0.03 wt % the amount of phosphorus may be 0 wt %.

The metal material may comprise tool steel.

In accordance with another embodiment, there is provided a metal part produced by the methods disclosed herein.

In accordance with another aspect, there is provided a three-dimensionally printed part. The three-dimensionally printed part may comprise a top portion, a bottom portion, and a plurality of sequential layers arranged in a predetermined form between the top portion and the bottom portion. The plurality of sequential layers may be formed of a print material comprising a metal material and at least one sintering aid in an amount effective to give the three-dimensionally printed part a density of between about 90% and about 100% after sintering.

In certain embodiments, the print material may comprise the at least one sintering aid in an amount effective to give the three-dimensionally printed part a density of between about 95% and about 100% after sintering.

The at least one sintering aid may comprise boron.

The at least one sintering aid may comprise phosphorous.

The at least one sintering aid may comprise silicon.

The metal material may comprise a stainless steel print material.

The metal material may comprise a tool steel print material.

In certain embodiments, the print material may comprise boron as a first sintering aid in an amount from about 0 wt % to about 0.4 wt % based on a weight of metal components of the metal material, phosphorus as a second sintering aid in an amount from about 0 wt % to about 1 wt % based on the weight of the metal components of the metal material, wherein if the amount of boron is at least 0.1 wt % the amount of phosphorus is 0 wt %. The print material may comprise a stainless steel print material.

In certain embodiments, the print material may comprise boron as a first sintering aid in an amount from about 0 wt % to about 0.4 wt % based on a weight of metal components of the metal material, phosphorus as a second sintering aid in an amount from about 0 wt % to about 1 wt % based on the weight of the metal components of the metal material, wherein if the amount of boron is at least 0.03 wt % the amount of phosphorus is 0 wt %. The print material may comprise a tool steel print material.

The metal material may be produced from a powder bed having a particle size distribution with 90% of particles having a diameter of less than about 50 µm.

The metal material may be produced from a powder bed having a particle size distribution with 90% of particles having a diameter of less than about 18 µm.

The metal material may be produced from a powder bed having a particle size distribution with 90% of particles having a diameter of less than about 12 µm.

The metal material may be produced from a raw powderized metal having a particle size distribution with 90% of particles having a diameter of less than about 50 µm.

The metal material may be produced from a raw powderized metal having a particle size distribution with 90% of particles having a diameter of less than about 18 µm.

The metal material may be produced from a raw powderized metal having a particle size distribution with 90% of particles having a diameter of less than about 12 µm.

In accordance with another aspect, there is provided metal part formed of a three-dimensionally printed sintered metal material. The metal material may comprise boron as a first sintering aid in an amount from about 0 wt % to about 0.4 wt % based on a weight of metal components of the metal material and phosphorus as a second sintering aid in an amount from about 0 wt % to about 1 wt % based on the weight of the metal components of the metal material. In some embodiments, if the amount of boron is at least 0.1 wt % the amount of phosphorus may be 0 wt %.

In some embodiments, if the amount of boron is at least 0.03 wt % the amount of phosphorus may be 0 wt %.

In some embodiments, the three-dimensionally printed sintered metal material may comprise stainless steel.

In some embodiments, the three-dimensionally printed sintered metal material may comprise tool steel.

In accordance with yet another aspect, there is provided a method of printing a three-dimensional part. The method may comprise obtaining a print material comprising a metal material and at least one sintering aid in an amount effective to give the three-dimensional part a density of between about 90% and about 100% after sintering. The method may comprise printing the three-dimensional part by forming sequential layers of the print material in a predetermined form. The method may comprise heating the printed three-dimensional part to a sintering temperature for a predetermined amount of time to form a sintered three-dimensional part.

In some embodiments, the print material may be in the form of a filament.

In some embodiments, the print material may be in the form of a powder bed.

In some embodiments, the print material may be in the form of an ink comprising a binding agent.

The print material may comprise the at least one sintering aid in an amount effective to give the three-dimensionally printed part a density of between about 95% and about 100% after sintering.

The method may comprise heating to a temperature of below 1250° C. for the predetermined time of between about 1 hour and about 10 hours.

The method may comprise heating to a temperature of between about 1200° C. and about 1400° C. for the predetermined time of between about 1 hour and about 7 hours.

In accordance with yet another aspect, there is provided a method of forming a material for producing a three-dimensionally printed part. The method may comprise selecting a metal material. The method may comprise incorporating at least one sintering aid into the metal material in an amount effective to give the three-dimensionally printed part a density of between about 90% and about 100% after sintering.

The method may comprise forming the metal material and the at least one sintering aid into a powder bed.

The method may comprise forming the metal material and the at least one sintering aid into a filament.

The method may comprise selecting the metal material to comprise stainless steel.

In some embodiments, the method may further comprise incorporating boron as a first sintering aid in an amount from about 0 wt % to about 0.4 wt % based on a weight of metal components of the metal material and incorporating phosphorus as a second sintering aid in an amount from about 0 wt % to about 1 wt % based on the weight of the metal components of the metal material, wherein if the amount of boron is at least 0.1 wt %, the amount of phosphorus is 0 wt %.

The method may comprise selecting the metal material to comprise tool steel.

In some embodiments, the method may further comprise incorporating boron as a first sintering aid in an amount from about 0 wt % to about 0.4 wt % based on a weight of metal components of the metal material, and incorporating phosphorus as a second sintering aid in an amount from about 0 wt % to about 1 wt % based on the weight of the metal components of the metal material, wherein if the amount of boron is at least 0.03 wt % the amount of phosphorus is 0 wt %.

In some embodiments, the method may comprise incorporating the at least one sintering aid comprising boron.

In some embodiments, the method may comprise incorporating the at least one sintering aid comprising phosphorous.

In some embodiments, the method may comprise incorporating the at least one sintering aid comprising silicon.

The disclosure contemplates all combinations of any one or more of the foregoing aspects and/or embodiments, as well as combinations with any one or more of the embodiments set forth in the detailed description and any examples.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure.

In the figures.

DETAILED DESCRIPTION

Various methods of 3D printing may be employed by the systems and methods disclosed herein. In a freeform filament fabrication (FFF) additive manufacturing system, a 3D part may be printed from a digital representation of the 3D part in a layer-by-layer manner by depositing a part material along toolpaths. The part material is deposited via a nozzle carried by a print head of a 3D-printing device or system and is deposited as a sequence of roads on a substrate in a build plane. The deposited part material fuses to previously deposited part material and is then solidified. The position of the print head relative to the substrate is then incremented along one or more print axes, and the process can then be repeated to form a 3D part resembling the 3D computer model.

In powder-based methods of 3D-printing, powder in a powder bed is selectively bound in a layer-by-layer manner. For example, in binder-jetting-based 3D-printing systems, a binding agent is selectively deposited via nozzles, on a layer-by-layer basis to join together powder particles. In a laser-based 3D-printing system such as multi-laser selective laser melting (SLM) systems, direct metal laser sintering (DMLS) systems, selective laser sintering (SLS) systems, or stereolithography (SLA) systems, material can be bound together in a layer-by-layer manner using a light-emitting source.

Methods disclosed herein may comprise forming sequential layers of a print material in a predetermined form. The predetermined form is generally selected based on the form desired for a final part, with consideration of a post-processing method that may be employed. The predetermined form may be substantially equivalent to the form desired for the final part. The predetermined form may be larger or smaller than the form desired for the final part. Post-processing methods that may be considered when selecting the predetermined form include sintering, machining, sanding, and others. For instance, sintering may reduce pore volume of a final part. Thus, a predetermined form for a sintering method may be slightly larger than the form desired for the final part. In general, the predetermined form may be substantially proportional to the form desired for the final part.

The 3D-printed parts may be formed of sequentially deposited layers of print material arranged between a top portion and a bottom portion which define the predetermined form. After formation, the sequential layers of print material may be treated by one or more of washing, debinding, and sintering to form the 3D-printed part. Washing and/or debinding the print material may be performed for removal of a binder or other component employed during formation of the print material.

The washed and/or debound material may be sintered to form the 3D-printed part. Sintering may generally alter one or more physical properties of the print material, thus forming the final part. Sintering may include heating the printed part to a sintering temperature for a predetermined amount of time. Typically, the sintering temperature may be between about 1000° C. and about 1500° C. and the amount of time may be generally between about 0.5 and 48 hours.

The disclosure often refers to 3D printing methods and 3D-printed parts. However, it should be understood that sintered metal parts formed by methods other than 3D printing are within the scope of the disclosure. For instance, methods may include producing a sintered metal part from a selected metal material by forming the metal part in a predetermined form and heating the formed metal part to complete sintering. Exemplary methods of production include any method that relies on metal powder sintering, for example, metal injection molding and press-and-sinter technologies. The methods disclosed herein may also be employed in the production of metal coatings, materials, and parts manufactured using cold spray technology. The methods disclosed herein may also be employed in the production of metal coatings produced using laser cladding technologies. Thus, the disclosure related to 3D printing which follows may be applied to other methods of forming metal parts and other metal part materials and products.

As disclosed herein "stainless steel" may refer to an iron based alloy having a resistance to rusting and oxidation. Stainless steel may be an iron based alloy containing a minimum of 10.5% chromium and a maximum of 1.2% carbon. Other alloying elements that may be contained in stainless steel include, for example, Ni, Cu, Mn, Mo, Nb, and Ta. In general, stainless steel may be characterized by an enhanced resistance to rusting and oxidation as compared to other steel materials.

Exemplary stainless steels include 304 stainless steel nominally containing 19.5% of Cr and 9.5% of Ni; 316 stainless steel nominally containing 17% Cr, 12% Ni, 2.5% Mo; 17-4 stainless steel nominally containing 16.25% Cr, 4% Ni, 3.25% Cu, 0.3% Nb; and 410 stainless steel nominally containing 12.5% Cr, 0.75% Ni. Other stainless steel materials are within the scope of the disclosure.

As disclosed herein, "tool steel" may refer to an iron based alloy which is heat-treatable. Tool steel may contain carbon and other carbide-forming metals. Exemplary carbide-forming metals which tool steel may comprise include, for example, Cr, Mo, V, and W. Tool steel is often employed in the manufacture of cutting and shaping tools for machines such as end mills, drills, press dies, etc.

Exemplary tool steels include A2 tool steel nominally containing 1% C, 5.12% Cr, 1.15% Mo, 0.32% V; D2 tool steel nominally containing 1.55% C, 11.75% Cr, 0.30% Si, 0.75% Mo, 0.75% V, 0.35% Mn; M2 tool steel nominally containing 0.85% C, 0.28% Mn, 0.30% Si, 4.15% Cr, 6.15% W, 5.00% Mo, 1.85% V; H13 tool steel nominally containing 5.12% Cr, 1.42% Mo, 1% Si, 1% V, 0.38% C, 0.35% Mn. Other tool steel materials are within the scope of the disclosure.

The disclosure often refers to density as a percent of theoretical. In general, density may be expressed as (for an object containing internal pores or voids), a percentage of theoretical density, where theoretical density can be defined as physical density of geometrically equivalent object of the same chemical and phase composition that does not contain voids or pores. The geometrically equivalent object may be characterized as a fully dense sample, which chemical and phase composition is substantially equivalent to the object. Theoretical density of such fully dense geometrically equivalent sample may be approximated to equal bulk density of the particular material in a wrought and fully annealed condition, as reported in metallurgical data handbooks such as "Properties and Selection: Irons, Steels, and High-Performance Alloys", ASM Handook, A S M 1993; and Davis, J. R. "Metals Handbook Desk Edition," ASM, 1998, each of which is herein incorporated by reference in its entirety for all purposes. For instance, theoretical density of 304 stainless steel can be approximated to 8.00 g/cc; theoretical density of 17-4PH stainless steel can be approximated to 7.85 g/cc; theoretical density of H13 tool steel can be approximated to 7.80 g/cc.

Physical density of sintered materials may be measured by a variety of methods. For instance, samples which do not contain interconnected porosity that can be penetrated by helium may be measured using a helium pycnometer. Samples which do not contain interconnected porosity that can be penetrated by water may be measured using the Archimedes method. Samples that contain interconnected porosity may be measured by measuring a sample of substantially similar material made or cut with sufficient precision into a geometric shape having a known volume. Examples of such shapes are a cube and a cylinder. The sample may be weighed to determine density. Other methods of density measurement may be employed.

The disclosure often refers to particle size distribution. In general, particle size distribution may include a list of values that represent a relative amount, by volume, of particles of a given diameter in a sample, for example, in a powder sample. Particle size may be measured by a variety of techniques, such as laser diffraction, microscopy techniques, and sieving analysis. Other methods of particle size distribution measurement may be employed.

Conventional 3D-printing technologies that rely on metal powder sintering as an operational step typically produce final parts which are not fully dense. For example, sintered parts typically contain a volume percent of pores. The volume percent of pores can typically range from about 0.01% to about 25%, for example, from about 1% to about 15% and more often from about 2% to about 8%. Improved physical, mechanical, and corrosion properties may be provided by reducing the porosity volume fraction of the 3D-printed parts. For instance, fatigue strength may be influenced by the pore volume of a part, where a greater pore volume tends to reduce fatigue strength. Reducing pore volume may also improve electrical conductivity, thermal conductivity, and tensile strength of the final part. Reducing pore volume and, thus, increasing density, may provide superior metal sintered parts.

Conventional approaches for increasing the density of 3D-printed metal parts typically include increasing sintering temperature and time, decreasing metal powder size used for 3D printing, subjecting already sintered parts to a hot isostatic pressing (HIPing) operation, or a combination thereof. However, use of these conventional methods alone has drawbacks. For instance, increased sintering temperature requires greater energy consumption and reduces furnace lifespan. Certain furnaces may not be able to withstand increased sintering temperatures. For example, some furnace constructions having silica tubes fail at temperatures greater than 1200° C. Additionally, diffusion and oxidation processes that contribute to furnace failure typically accelerate exponentially with increasing temperature. More refractory and oxidation resistant materials could be used to construct high temperature furnaces, but costs of such furnaces are expected to rise substantially. Finer 3D printing metal powder size would generally result in higher density of a sintered part. However, smaller particle size metal powders suffer from reduced availability and much higher price compared to coarser powders.

Also, certain 3D printing technologies, for example, powder bed binder jetting, typically work better with coarser particles rather than fine ones. Fine powders tend to also carry greater health risks (including, for example, contributing to respiratory disorders, and increased flammability and explosiveness) than coarser powders. HIPing technology may be used to produce full or near full dense 3D-printed parts. However, HIPing is a separate and expensive batch operation which requires specialized equipment and materials. HIPing is generally provided by specialized companies, which would not be economical for the prototyping and small batch runs typical of 3D printing technology.

The methods disclosed herein may be employed to increase density of 3D-printed parts without incurring such drawbacks as shortened furnace lifespan, increased cost and health risk of finer metal powder, and additional equipment and materials needed for a HIPing operation. Instead, the methods disclosed herein generally involve adding sintering aids to the materials used for 3D printing in an amount effective to increase density. In certain embodiments, the methods disclosed herein may additionally involve adding the sintering aids in a predetermined weight fraction, specific to the metallurgy material chemical composition.

Any process of 3D printing that relies on sintering as an operation may be used for the methods disclosed herein. For example, a process for 3D printing metal parts, which includes steps of layer-by-layer deposition of metal powder particles bound by a polymer binder, debinding, and sintering of the parts may be modified by the methods disclosed herein. In certain embodiments, any metal part manufacturing process that relies on sintering may be used for the methods disclosed herein, regardless of whether 3D printing was employed.

Sintering is generally a solid-state process. In a typical sintering process, metal particles form a solid metal body thermodynamically driven by metal powder surface energy reduction and accomplished via solid state diffusion mechanisms. Since solid state diffusion is relatively slow (by several orders of magnitude) compared to diffusion in liquid phase, an overall process speed and efficiency may be increased if even a small amount of liquid phase is introduced along the metal powder particles' grain boundaries and/or external boundaries. One or more sintering aids added to the metal powder system may increase speed and efficiency of the solid state diffusion by providing liquid phase mechanics during sintering.

Sintering aids which may be employed include those additives that facilitate sintering. Particular sintering aids may be selected based on the metallurgy material, to modify grain boundary and surface energy and enhance volume diffusion rate in favor of densification. Common sintering aids include, for example, boron, phosphorus, and silicon. Other sintering aids may include, for example, copper and molybdenum. Any one or more of these exemplary sintering aids may be included in the print material. In an exemplary embodiment, sintering aids for steel powders, such as boron and phosphorus, may form low-melting point eutectics with iron, providing a liquid phase along the steel particles' grain boundaries and between the particles to accelerate diffusion and sintering. Other sintering aids may be used, in particular when the metal material is not steel.

Thus, in accordance with at least one embodiment described herein, one or more sintering aids may be added to a 3D-printing material. The sintering aid may be added by different methods to different types of printing materials. For instance, the sintering aid may be incorporated in a filament used in filament deposition modeling technologies. The filament may be formed by combining the sintering aid with a powder bed feedstock which is subsequently converted into the filament. In another embodiment, the sintering aid may be included in a metal alloy composition. The method may comprise incorporating the sintering aid by forming the filament including the sintering aid.

In powder-based methods, a powderized sintering aid may be incorporated in a powder bed. In another embodiment, the sintering aid may be incorporated as an alloying addition to the powdered metal. Alternatively or additionally, the sintering aid may be incorporated in a binder or in an ink containing a binding agent. Thus, in accordance with certain embodiments, a composition for binding sequential layers of a metal material in a 3D-printed part comprising a binding agent and a sintering aid is disclosed.

The binding agent may be any binding agent known in the art for sintering metal parts. In certain embodiments, the binding agent may be inert towards the sintering aid. For example, the binding agent may be selected to reduce potentially adverse effects with the sintering aid. In some non-limiting embodiments, the binding agent may be or comprise stearic acid.

The binding agent may be soluble or non-soluble. Some soluble-pyrolysable binder combinations include one or more of polyethylene glycol (PEG), polymethyl methacrylate (PMMA) (optionally in emulsion form), stearic acid, waxes (for example, carnauba, bees wax, paraffin), steatite, polyethylene (PE), and polyvinylbutyral (PVB). Some pyrolysable second stage binders may include one or more of polyolefin resins polypropylene (PP), high-density polyethylene (HDPE), linear low-density polyethylene (LLDPE), and polyoxymethylene copolymer (POM). Other exemplary binders include polyethers such as poly(ethylene oxide)s (also known as poly(ethylene glycol)s, poly(propylene oxide)s, (also known as poly(propylene glycol)s, ethylene oxide-propylene oxide copolymers, cellulosic resins (such as ethyl cellulose, ethyl hydroxyethyl cellulose, carboxymethyl cellulose, cellulose acetate, cellulose acetate propionates, and cellulose acetate butyrates), and poly(vinylbutyral), polyvinyl alcohol and its derivatives, ethylene/vinyl acetate polymers, acrylic polymers and copolymers, styrenefacrylic copolymers, styrene-maleic anhydride copolymers, isobutylene/maleic anhydride copolymers, vinyl acetate/ethylene copolymers, ethylene-acrylic acid copolymers, polyolefins, polystyrenes, olefin and styrene copolymers, epoxy resins, acrylic latex polymers, polyester acrylate oligomers and polymers, and/or polyester diol diacrylate polymers.

In an exemplary embodiment, boron and phosphorus may be introduced into 3D-printing steel material via various routes. For example, either or both boron and phosphorus may be added into molten steel during powder production of a steel. Alternatively, boron may be added in elemental powder form to a metal-polymer feed stock for filament deposition modelling technology. Boron may be added to a powder bed stock or binder ink for powder bed binder jetting technology. Phosphorus may be added in a chemical compound (e.g., $Fe_3P$) powder form to a metal-polymer feed stock for filament deposition modelling technology. Phosphorus may be added to a powder bed stock or binder ink for powder bed binder jetting technology. Other metal materials and sintering aids are within the scope of the disclosure.

Sintering aids may be added in an amount effective to increase density of the final part. Generally, the amount effective to increase density may be dependent on one or more factors. For example, the amount effective to increase density may be dependent on factors such as sintering aid chemical composition, powder metallurgy material chemical composition, physical characteristics of the final part, and manufacturing method. The amount effective to increase density may also be dependent on manufacturing method factors such as temperature and time of one or more production reactions.

Sintering aids may be added in an amount effective to give the final part a predetermined density for a selected set of sintering conditions. The predetermined density may be between about 80% and about 100% of a theoretical density, as selected. As disclosed herein, percentage densities refer to a percentage of a theoretical density for the selected material. In some embodiments, the predetermined density may be between about 90% and about 100%, between about 93% and 100%, between about 95% and 100%, or between about 97% and about 100%. The predetermined density may be at least about 90%, about 91%, about 92%, about 93%, about 94%, about 95%, about 96%, about 97%, about 98%, about 99%, about 99.9%, about 99.99%, or about 100%. Thus, in accordance with certain embodiments, sintering aids may be added in an amount effective to give the final part a density of between about 90% and about 100% or as selected.

Sintering aids may be added in an amount effective to form a final part having a predetermined volume percent of pores for a selected set of sintering conditions. The predetermined volume percent of pores may generally be a lower volume percent than a similar material which is substantially free of the sintering aid and has been sintered under similar conditions. The predetermined volume percent of pores may be between about 0.01% and about 8% as selected. In some embodiments, the predetermined volume percent of pores may be between about 0.01% and about 5%, between about 0.01% and about 4%, between about 0.01% and about 3%, or between about 0.01% and about 2%. The predetermined volume percent of pores may be less than about 8%, less than about 7%, less than about 6%, less than about 5%, less than about 4%, less than about 3%, less than about 2%, less than about 1%, less than about 0.5%, less than about 0.1%, or less than about 0.05%. Thus, in accordance with certain embodiments, sintering aids may be added in an amount effective to give the final part a volume percent of pores of between about 0.01% and about 5% or as selected.

An amount of sintering aid added to the print material may have an effect on the chemical composition of the final part. Thus, in some embodiments, the upper limit of the amount of a particular sintering aid added may be selected based on a desired chemical composition of the final part. For example, certain steel manufactured parts may have a maximum amount of phosphorus of between about 0.03% and 0.05%. Thus, an amount of phosphorus added to a steel manufactured part may be selected based on manufacturing requirements for steel. Other final materials may have different requirements.

It is also recognized that an amount of sintering aid added to the print material may have an effect on brittleness of the final part. Brittleness is a measure of minimally allowed plastic strain in the material when subjected to increasing stress. In some embodiments, the upper limit of the amount of a particular sintering aid may be selected based on acceptable brittleness of the final part. The upper limit of the amount of a particular sintering aid may be selected based on a desired ductility, hardness, and/or elasticity of the final part. Ductility may be quantified by fracture strain $\varepsilon_f$, which is the engineering strain at which a test specimen fractures during a uniaxial tensile test, and/or reduction of area at fracture q. In an exemplary embodiment, addition of boron as a sintering aid may induce the formation of a brittle grain boundary when added in excess of 0.1% to certain steels. In accordance with certain embodiments, an amount of boron added to a steel manufactured part may be selected based on an acceptable brittleness of the final part. Other final materials may have different brittleness, ductility, hardness, and/or elasticity requirements.

The methods disclosed herein may comprise heating the printed 3D part to complete the sintering process. With conventional materials, the sintering temperature may be around 1250° C. and the amount of sintering time may generally be between about 12 and 48 hours. The materials and methods disclosed herein may be used to reduce the temperature and/or time required for sintering a part to the same density. A reduction in sintering temperature may extend the life of a furnace. Alternatively, a reduction in sintering temperature may allow use of a lower temperature furnace, which is more widely available. A reduction in sintering time may also improve productivity in manufacturing of sintered metal parts.

The sintering temperature of the methods disclosed herein may be below 1500° C., and in certain embodiments below 1250° C. The sintering temperature may be between 1050° C. and 1500° C., for example, between 1200° C. and 1400° C., or between 1200° C. and 1300° C. In other embodiments, the sintering temperature may be between about 1100° C. and about 1250° C., between about 1125° C. and about 1225° C., or between about 1150° C. and about 1200° C. By including sintering aids, the described temperatures may provide sintered parts having a density of greater than about 90%, as comparable to a metal part sintered at a higher temperature without sintering aids. Additionally or alternatively, by including sintering aids, a shorter sintering time may provide sintered parts having a density of greater than about 90%, as comparable to a metal part sintered for a longer period of time without sintering aids. The sintering time may be between about 1 hour and about 10 hours, between about 1 hour and about 7 hours, between about 1 hour and about 3 hours, or between about 2 hours and about 3 hours, depending on composition of the print material and sintering temperature.

The sintering time may be 1-6 hours, for example, 2-4 hours. Exemplary sintering temperatures and times are shown in Table 1. The sintering times of Table 1 may refer to a complete sintering time or an amount of time sintering at the given sintering temperature. It is noted that sintering generally includes a temperature ramp up time, a hold at the sintering temperature, and a temperature ramp down time. Thus, the exemplary times of Table 1 may refer to the time holding the print material at the sintering temperature or, alternatively, to the time including temperature ramp up, hold, and temperature ramp down, depending on the embodiment. The sintering temperatures and times of Table 1 are exemplary. Additional embodiments are within the scope of the disclosure.

TABLE 1

Exemplary Sintering Temperatures and Times for Different Embodiments

| Sintering Temperature (° C.) | Time at the Sintering Temperature (hours) | Time at the Sintering Temperature (hours) | Time at the Sintering Temperature (hours) |
| --- | --- | --- | --- |
| 1000 | 1.0-4.0 | 4.0-8.0 | 8.0-48.0 |
| 1050 | 1.0-4.0 | 4.0-8.0 | 8.0-24.0 |
| 1100 | 1.0-2.0 | 2.0-4.0 | 4.0-16.0 |
| 1150 | 1.0-2.0 | 2.0-4.0 | 4.0-12.0 |
| 1200 | 1.0-2.0 | 2.0-4.0 | 4.0-10.0 |
| 1250 | 1.0-2.0 | 2.0-4.0 | 4.0-10.0 |
| 1300 | 0.5-1.0 | 1.0-2.0 | 2.0-6.0 |

TABLE 1-continued

Exemplary Sintering Temperatures and Times for Different Embodiments

| Sintering Temperature (° C.) | Time at the Sintering Temperature (hours) | Time at the Sintering Temperature (hours) | Time at the Sintering Temperature (hours) |
| --- | --- | --- | --- |
| 1350 | 0.5-1.0 | 0.5-2.0 | 2.0-6.0 |
| 1400 | 0.1-1.0 | 0.5-2.0 | 2.0-6.0 |
| 1450 | 0.1-1.0 | 0.5-2.0 | 2.0-6.0 |
| 1500 | 0.1-0.5 | 0.5-1.0 | 1.0-2.0 |
| 1550 | 0.1-0.5 | 0.5-1.0 | 1.0-2.0 |

Figure 1:
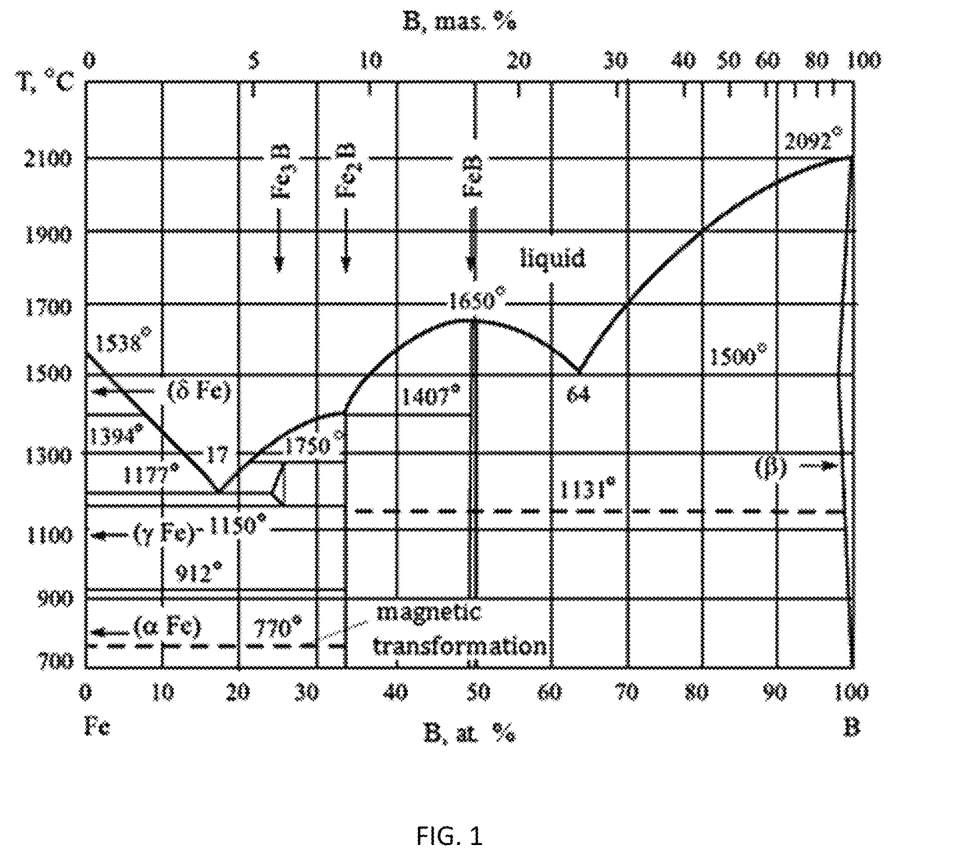
FIG. 1 is an iron-boron phase diagram.

In an exemplary embodiment, boron may be added to steel to improve sintering. As the Fe—B phase diagram shows (FIG. 1), boron is typically not soluble in iron in solid state. If boron is added to iron, an eutectic with low melting point of 1177° C. is formed. It can be expected that if boron is added to a sintered powder steel system, a liquid phase will appear at temperatures over 1177° C. Liquid phase may allow for better sliding and rotation of steel particles during sintering and provide a fast diffusion path to transport iron atoms, resulting in increased density after sintering and allowing for lower sintering temperatures.

Boron may be added in a concentration of between about 0.001 wt % and about 1 wt % based on a weight of the metal components in the metal print material. Boron may be added in a concentration of between about 0.001 wt % and 0.6 wt %, between about 0.2 wt % and about 0.6 wt %, between about 0.2 wt % and about 0.4 wt %, between about 0.1 wt % and about 0.2 wt %, between about 0.05 wt % and about 0.2 wt %, between about 0.05 wt % and about 0.1 wt %, between about 0.03 wt % and about 0.1 wt %, or between about 0.03 wt % and about 0.05 wt %, depending on the chemical composition of the print material and desired properties of the printed part.

In an exemplary embodiment, for tool steel, boron may be incorporated in a concentration of between about 0.001 wt % and about 0.5 wt %, between about 0.05 wt % and about 0.2 wt %, or between about 0.03 wt % and about 0.05 wt %. In another exemplary embodiment, for stainless steel, boron may be incorporated in a concentration of between about 0.001 wt % and about 1 wt %, between about 0.2 wt % and about 0.4 wt %, or between about 0.1 wt % and about 0.2 wt %. In certain embodiments, boron may be incorporated as a sintering aid alone or in combination with other sintering aids. Thus, boron may be added in a concentration of between about 0 wt % and about 0.6 wt %, between about 0 wt % and about 0.5 wt %, between about 0 wt % and about 0.4 wt %, between about 0 wt % and about 0.2 wt %, between about 0 wt % and about 0.1 wt %, between about 0 wt % and about 0.05 wt %, or between about 0 wt % and about 0.03 wt %.

Boron may be added in the form of nickel boride. Nickel boride addition may typically result in a microstructure of discrete networks of boride at the grain boundary. In other embodiments, boron may be added in the form of elemental boron or ferroboron. In general, any form of boron that will have a sintering effect on the metal material may be used.

Figure 2:
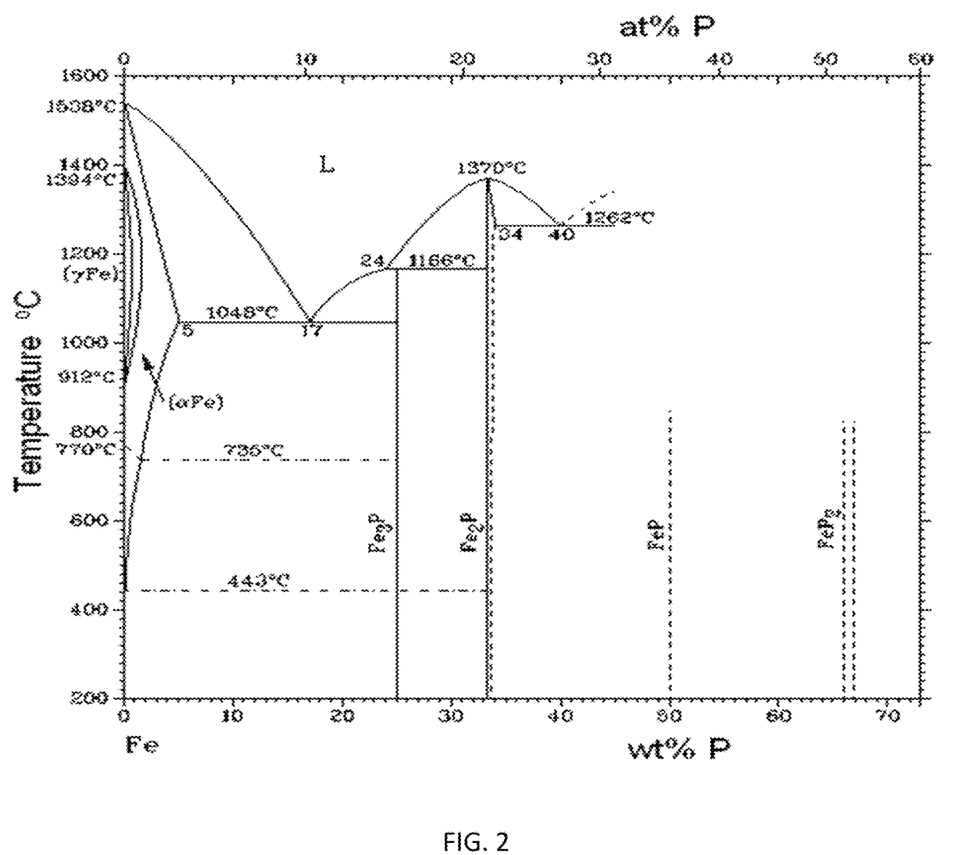
FIG. 2 is an iron-phosphorus phase diagram.

In another exemplary embodiment, phosphorus may be added to steel. As the Fe—P phase diagram shows (FIG. 2), phosphorus forms a low temperature eutectic with iron at 1048° C. Phosphorus addition to steel is generally contrary to the conventional practice of steel making. Phosphorus tends to segregate to grain boundaries. However, in controlled amounts, phosphorus may be used to improve density of sintered steel and reduce porosity. Addition of phosphorus should be controlled because phosphorus dissolves in iron at solid state with a maximum solubility of 5% by weight.

Phosphorus may be added in a concentration of between about 0.001 wt % and about 1 wt % based on a weight of the metal components in the metal print material. Phosphorus may be added in a concentration of between about 0.001 wt % and 0.6 wt %, between about 0.2 wt % and about 0.6 wt %, between about 0.2 wt % and about 0.4 wt %, or between about 0.05 wt % and about 0.2 wt %, depending on the chemical composition of the print material and desired properties of the printed part. In certain embodiments, phosphorus may be incorporated as a sintering aid alone or in combination with other sintering aids. Thus, phosphorus may be added in a concentration of between about 0 wt % and about 0.6 wt %, between about 0 wt % and about 0.5 wt %, between about 0 wt % and about 0.4 wt %, between about 0 wt % and about 0.2 wt %, or between about 0 wt % and about 0.05 wt %.

In general, the sintering aid may be added in a concentration of between about 0.001 wt % and about 1 wt % based on a weight of the metal components in the metal print material.

The sintering aids are generally incorporated in an amount effective to produce a sintered part having a desired density. In some embodiments, the addition of a single sintering aid, for example, only phosphorus or boron, in the amount effective to increase density may cause the sintered 3D-printed material to be out of a particular desired chemical composition specification because the amount would be too high. By adding smaller quantities of more than one sintering aid, for example, both boron and phosphorus, the desired chemical composition specification may be maintained. In other embodiments, some particular metals may be too sensitive to use a single sintering aid in the amount effective to increase density because they may cause appearance of brittle intermetallic phases, reducing 3D-printed part toughness. For example, boron may react not only with iron, but also with carbon in tool steels. The resulting reaction may cause embrittlement of a 3D-printed material. In such embodiments, a reduced boron concentration may be employed. The reduced concentration may be compensated by addition of phosphorus to keep the sintered density of the 3D-printed material at a maximized value. Equations (1A)-(1B) and (2A)-(2B) may be used to create a part having the desired density with a combination of sintering aids, while reducing incidence of the negative effects resulting from addition of a high concentration of a single sintering aid alone.

The sintering aids may be incorporated into a substantially homogeneous part material. A part material may have a substantially uniform or even composition. For instance, a substantially homogeneous part material may have a similar composition throughout different samples. Substantially homogeneous part materials may be provided as one or more of powders, fluids, blends, dispersions, colloids, suspensions, and mixtures.

The forming atmosphere for the sintering aid incorporation process may have an effect on the part material composition during the incorporation reaction. Thus, in some embodiments, the sintering aid may be incorporated into the part material under inert conditions. Inert conditions may include, for example, under vacuum or in a controlled environment. For instance, nitrogen may have a neutralizing effect with boron due to formation of boron nitride, eliminating any positive effect of boron addition. To prevent neutralization, boron may be incorporated under vacuum conditions. In other embodiments, boron may be incorporated in an inert atmosphere, for example, in hydrogen or argon. Other sintering aids may be added under vacuum or in an inert atmosphere.

The methods disclosed herein may comprise selecting a metal material to form the 3D-printed part. The metal material may comprise iron, molybdenum, manganese, chromium, nickel, titanium, niobium, tantalum, cobalt, copper, and any combination or alloy thereof. For instance, the metal material may comprise steel or a nickel-based super alloy, e.g., inconel. In certain embodiments, the metal material may comprise stainless steel. In other embodiments, the metal material may comprise tool steel. In yet other embodiments, the metal material may comprise inconel.

The metal material may be in the form of a filament. For example, in freeform filament fabrication, print material is deposited in a predetermined form from an extruded filament. Each layer of deposited print material is bound to a previously deposited layer. Filaments may be formed from powderized raw material bound by a polymer binder. The filament may generally be fed into the 3D printer and extruded for layer by layer deposition onto a build platform to create the part. Additionally or alternatively, the metal material may be in the form of a rod or a pellet.

Figure 3:
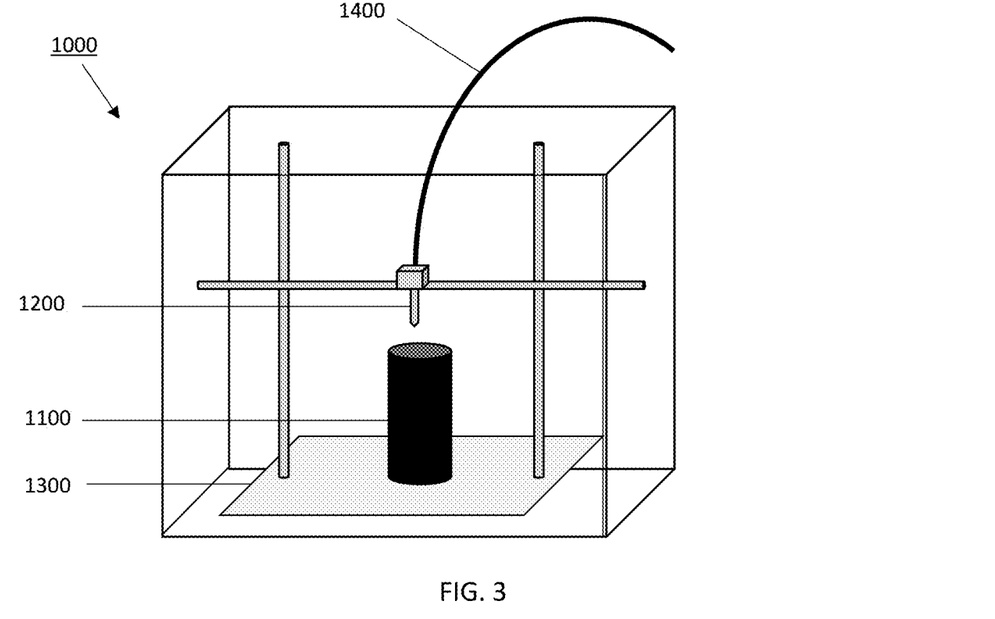
FIG. 3 is a schematic drawing of a 3D printer, according to one embodiment.

FIG. 3 is a schematic diagram of a freeform filament fabrication 3D printer 1000. In the exemplary embodiment of FIG. 3, the nozzle 1200 extrudes print material from the filament 1400 to form the printed part 1100 on build platform 1300. Filament 1400 may include metal powder particles bound by a polymer binder and can additionally include one or more sintering aids, as discussed above.

Alternatively, the metal material may be in the form of a powder bed. As previously described, in powder-based methods of 3D printing, a powderized metal material is selectively bound in a layer-by-layer manner. In certain methods, a binding agent is deposited via nozzles to bind the sequential layers of the powderized metal material.

Figure 4:
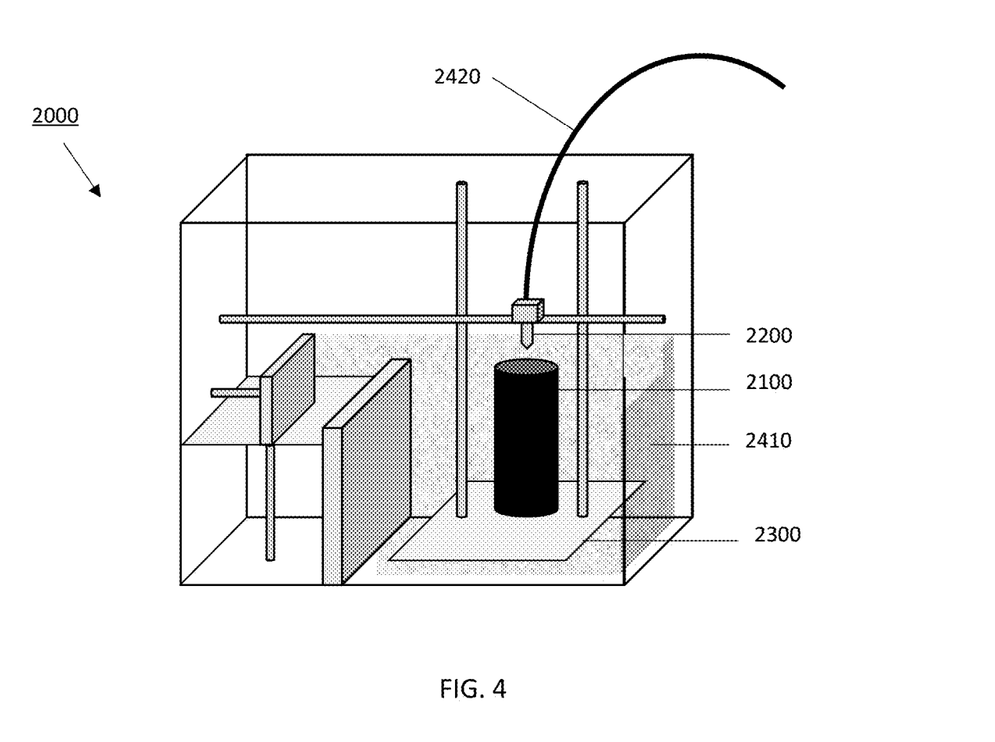
FIG. 4 is a schematic drawing of a 3D printer, according to another embodiment.

FIG. 4 is a schematic diagram of a binder jetting 3D printer 2000. In the exemplary embodiment of FIG. 4, the nozzle 2200 deposits ink 2420 having a binding agent to selectively bind powderized print material from the powder bed 2410 and form the printed part 2100 on build platform 2300. The powderized print material may include powderized metal material. At least one of ink 2420 and powder bed 2410 may include one or more sintering aids.

The one or more sintering aids utilized in a freeform filament fabrication printer or binder jetting printer, described above, may allow production of a 3D printed part with larger metallic powder particle sizes. A powderized material may generally refer to a collection of particles having an average dimension of below 1 mm in any axis measured. Generally, in 3D printing, powders may be spheroid, rounded, or otherwise compact. Powder particles may generally have diameters ranging from less than 1 to 75 μm. For instance, powder particles may have diameters of less than 1 μm. Powder particles may have diameters of between 1-25 μm. Powder particles may have diameters of between 5-75 μm. A powder may have an average diameter of particles as described herein. A powder may have at least 90%, at least 95%, at least 99%, or at least about 100% of its particles having a diameter as described herein. Powder particles may be produced by known methods, for example, water atomization, gas atomization, vacuum atomization, plasma atomization, granulation, and sol-gel techniques.

In certain embodiments, the powderized metal material or powderized raw material may have a particle size distribution with 90% of particles having a diameter of less than about 100 µm. The powderized metal material or powderized raw material may have a particle size distribution with 90% of particles having a diameter of less than about 75 µm, less than about 50 µm, less than about 25 µm, or less than about 20 µm. The powderized metal material or powderized raw material may have a particle size distribution with 90% of particles having a diameter of less than about 18 µm. The powderized metal material or powderized raw material may have a particle size distribution with 90% of particles having a diameter of less than about 16 µm, less than about 12 µm, less than about 10 µm, or less than about 8 µm. The powderized metal material or powderized raw material may have a particle size distribution with an average particle size of greater than about 3 µm, about 5 µm, about 8 µm, greater than about 10 µm, greater than about 12 µm, or greater than about 16 µm. The powderized metal material or powderized raw material may have a particle size distribution with an average particle size of greater than about 18 µm, greater than about 20 µm, greater than about 25 µm, greater than about 50 µm, greater than about 75 µm, or greater than about 100 µm.

Figure 5:
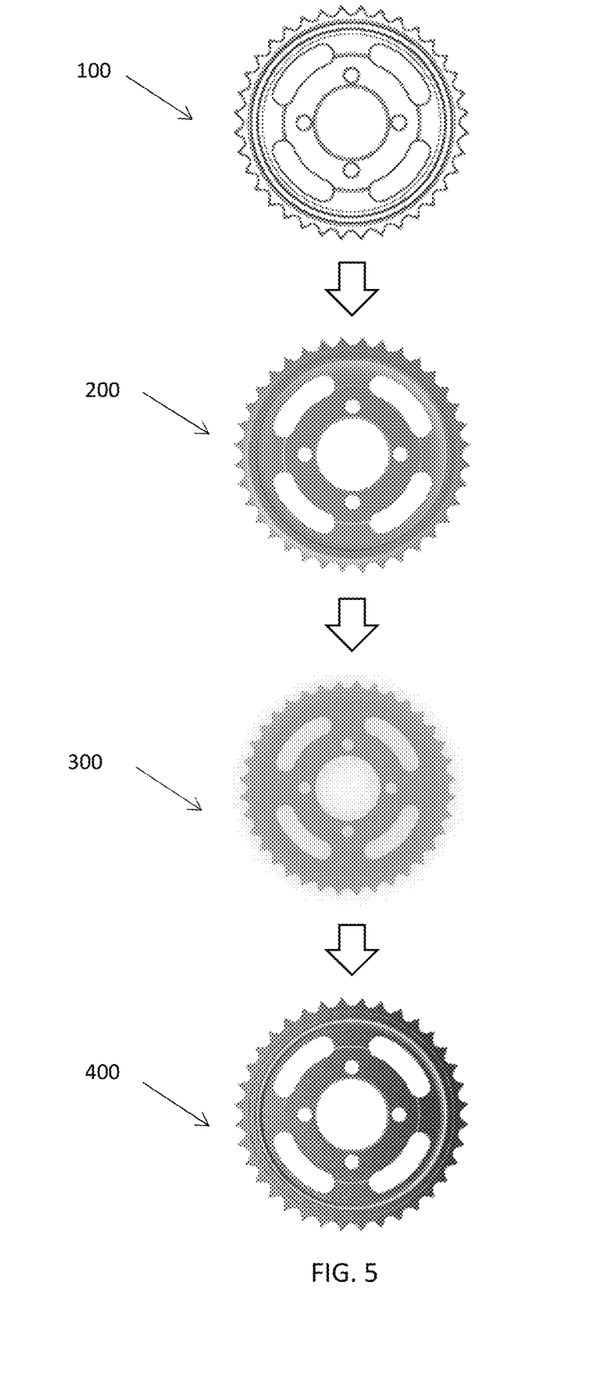
FIG. 5 is a schematic drawing showing steps of a method to produce a sintered part, according to one embodiment.

Thus, as shown in FIG. 5, the methods disclosed herein may comprise designing 100 a metal part to be formed. The methods disclosed herein may comprise printing or forming 200 the metal part from a print material having at least one sintering aid. The methods disclosed herein may comprise sintering 300 the printed or formed metal part, thereby producing 400 a sintered metal part having an increased density.

Figure 6A:
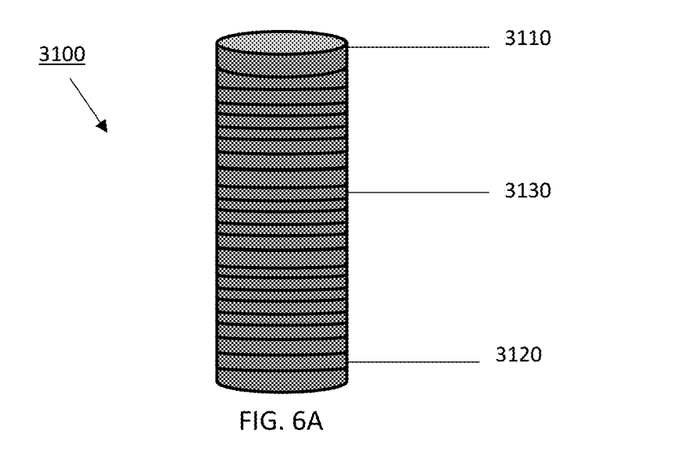
FIG. 6A is a schematic drawing of a printed or formed part, according to one embodiment.
Figure 6B:
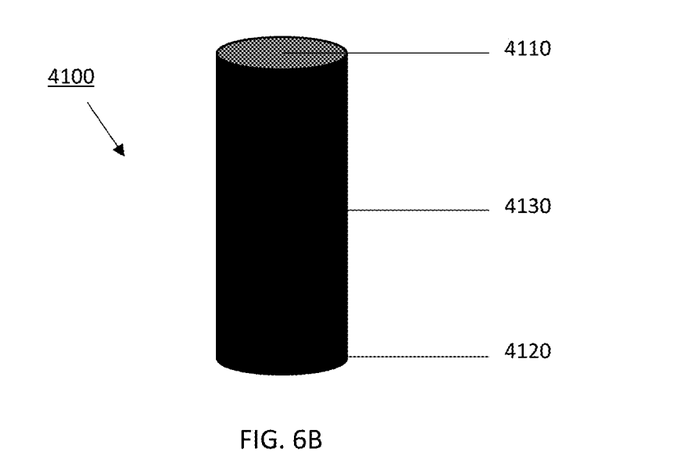
FIG. 6B is a schematic drawing of the printed or formed part of FIG. 6A after sintering, according to one embodiment.

Parts formed by the methods disclosed herein are also provided. In particular, metal parts formed of 3D-printed sintered metal comprising at least one sintering aid are disclosed. The printed part 3100, for example, as shown in FIG. 6A, may include a top portion 3110, a bottom portion 3120, and sequential layers of print material 3130 dispensed between the top portion 3110 and the bottom portion 3120 in a predetermined form. The printed part 3100 may be sintered to complete production. The sintered printed part 4100, for example, as shown in FIG. 6B, may include the top portion 4110, bottom portion 4120, and sequential layers 4130 which have been sintered.

Materials for producing parts disclosed herein are also provided. In particular, print materials including at least one sintering aid are disclosed. The print materials may be in the form of a powder bed, a filament, or an ink, as previously described.

Examples of the methods and systems discussed herein are not limited in application to the details of construction and the arrangement of components set forth in the description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are no intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

EXAMPLES

The embodiments may be further understood with reference to the following examples. The examples are intended to serve as an illustration and are not limiting.

Prophetic Example 1: Stainless Steel

Boron and phosphorus may be incorporated in amounts based on equations (1A)-(1B). Under equation (1A), if the amount of boron is at least 0.1 wt %, the amount of phosphorus is 0 wt %. According to equation (1A), if the amount of boron is less than 0.1 wt %, the amount of phosphorus is defined by:

$$P = 0.4 * \left(1 - \frac{(0.1 - B)}{0.1}\right) \quad (1A)$$

where:
P is the amount of phosphorus in wt %; and
B is the amount of boron in wt %.

Under equation (1B), if the amount of boron is at least 0.2 wt %, the amount of phosphorus is 0 wt %. According to equation (1B), if the amount of boron is less than 0.1 wt %, the amount of phosphorus is defined by:

$$P = 0.4 * \left(1 - \frac{(0.2 - B)}{0.2}\right) \quad (1B)$$

where:
P is the amount of phosphorus in wt %; and
B is the amount of boron in wt %.

The relationship of equations (1A)-(1B) may be used, for example, when the metal material is stainless steel.

The disclosed equations allow for a flexibility in the sintering aid choice. Using the proposed equation, the sintering aid may be a boron additive alone, a phosphorus additive alone, or a combined boron and phosphorus additive in a relationship that may maximize the sintered density of a 3D-printed material.

Prophetic Example 2: Tool Steel

Boron and phosphorus may be incorporated in amounts based on equations (2A)-(2B).

Under equation (2A), if the amount of boron is at least 0.03 wt %, the amount of phosphorus is 0 wt %. According to equation (2A), if the amount of boron is less than 0.03 wt %, the amount of phosphorus is defined by:

$$P = 0.35 * \left(1 - \frac{(0.030 - B)}{0.030}\right) \quad (2A)$$

where:
P is the amount of phosphorus in wt %; and
B is the amount of boron in wt %.
Under equation (2B), if the amount of boron is at least 0.05 wt %, the amount of phosphorus is 0 wt %. According to equation (2B), if the amount of boron is less than 0.05 wt %, the amount of phosphorus is defined by:

$$P = 0.35 * \left(1 - \frac{(0.050 - B)}{0.050}\right) \quad (2B)$$

where:
P is the amount of phosphorus in wt %; and
B is the amount of boron in wt %.
The relationship of equations (2A)-(2B) may be used, for example, when the metal is tool steel.

The disclosed equations allow for a flexibility in the sintering aid choice. Using the proposed equation, the sintering aid may be a boron additive alone, a phosphorus additive alone, or a combined boron and phosphorus additive in a relationship that may maximize the sintered density of a 3D-printed material.

Example 1: Printed Sintered Parts

Samples printed with print materials as described in prophetic examples 1 and 2 were analyzed for density and percent of theoretical density. The results are shown in Table 2.

TABLE 2

Density of Sintered Parts

| Metal Type | Boron content (wt %) | Sintering Temperature (° C.) | Density (g/cc) | Density (% of theoretical) |
|---|---|---|---|---|
| Stainless Steel | 0 | 1250 | 7.08 | 90.2 |
| Stainless Steel | 0.2 | 1250 | 7.43 | 94.6 |
| Stainless Steel | 0.6 | 1250 | 7.53 | 95.9 |
| Tool Steel | 0 | 1200 | 7.21 | 92.4 |
| Tool Steel | 0.05 | 1200 | 7.43 | 95.3 |
| Tool Steel | 0.1 | 1200 | 7.67 | 98.3 |
| Tool Steel | 0 | 1250 | 7.37 | 94.5 |
| Tool Steel | 0.4 | 1250 | 7.66 | 98.3 |

Example 2: Reduced Temperature Sintering

A steel part was 3D-printed using freeform filament fabrication technology and H13 tool steel powder. The tool steel powder had a particle size distribution with 90% particles being less than 10 μm. Stearic acid was used as a binding agent in forming the steel pellets. The printed steel part was debound and held at the sintering temperature for 3 hours in a dry forming gas atmosphere (Ar+3% $H_2$).

The printed part was sintered at a temperature of 1250° C. After sintering, the printed part had a density of 93%.

An experimental printed part was manufactured with 0.05% boron micro powder added to the H13 tool steel powder. The experimental printed part was sintered at a lower temperature of 1200° C. After sintering, the experimental printed part had a density of 95%.

Thus, incorporating a sintering aid in a steel manufactured part may increase density of the manufactured part, even at a lower sintering temperature. Similar results are expected with other metals and other sintering aids.

Example 3: Larger Particle Size Manufacturing

A steel part was 3D-printed using freeform filament fabrication technology and 17-4PH stainless steel powder. The stainless steel powder had a particle size distribution with 90% particles being less than 18 μm. Stearic acid was used as a binding agent in forming the steel pellets. The printed steel part was debound and held at a sintering temperature of 1250° C. for 3 hours in a dry forming gas atmosphere (Ar+3% $H_2$).

After sintering, the printed part had a density of 92.5%.

An experimental printed part was manufactured with 0.4% boron micro powder added to the 17-4PH tool steel powder. After sintering, the experimental printed part had a density of 96%.

Thus, incorporating a sintering aid in a steel manufactured part may increase density of the manufactured part, even at a larger particle size. Similar results are expected with other metals and other sintering aids.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A material for producing a three-dimensionally printed part, comprising:
a metal material in the form of a powderized metal material in a powder bed; and
a sintering aid combination comprising boron as a first sintering aid and phosphorus as a second sintering aid in an amount effective to give the three-dimensionally printed part a density of between about 90% and about 100% after sintering.

2. The material of claim 1, wherein the material for producing the three-dimensionally printed part further comprises a binding agent.

3. The material of claim 2, wherein the sintering aid combination is in the form of a powderized sintering aid incorporated into the powder bed.

4. The material of claim 3, wherein the powder bed of the metal material has a particle size distribution with 90% of particles having a diameter of less than about 50 μm.

5. The material of claim 4, wherein the powder bed of the metal material has a particle size distribution with 90% of particles having a diameter of less than about 18 μm.

6. The material of claim 2, wherein the sintering aid combination is incorporated in an ink comprising the binding agent.

7. The material of claim 1, wherein the sintering aid combination further comprises silicon.

8. The material of claim 1, comprising boron in an amount up to about 0.4 wt % based on a weight of metal components of the metal material; and
phosphorus in an amount up to about 1 wt % based on the weight of the metal components of the metal material.

9. The material of claim 1, wherein the metal material is stainless steel or tool steel.

10. A material for producing a three-dimensionally printed part, comprising:
- a metal material, wherein the metal material comprises a filament; and
- a sintering aid combination comprising boron as a first sintering aid and phosphorus as a second sintering aid in an amount effective to give the three-dimensionally printed part a density of between about 90% and about 100% after sintering.

11. The material of claim 10, wherein the sintering aid combination is incorporated in the filament.

12. A method of printing a three-dimensional part, comprising:
- selecting a metal material for the three-dimensional part, wherein the metal material is in the form of a powderized metal material in a powder bed or comprises a filament;
- incorporating a sintering aid combination comprising boron as a first sintering aid and phosphorus as a second sintering aid into the metal material in an amount effective to give the three-dimensional part a density of between about 90% and about 100% after sintering to form a print material; and
- printing the three-dimensional part by forming sequential layers of the print material in a predetermined form.

13. The method of claim 12, further comprising heating the printed three-dimensional part to a sintering temperature below 1250° C. for a predetermined amount of time between about 1 hour and about 10 hours to form a sintered three-dimensional part.

14. The method of claim 12, further comprising heating the printed three-dimensional part to a sintering temperature between about 1200° C. and about 1400° C. for a predetermined amount of time between about 1 hour and about 7 hours to form a sintered three-dimensional part.

15. The method of claim 12, wherein the sintering aid combination is incorporated as a powderized sintering aid into the powder bed of the metal material, an ink comprising a binding agent, or the filament formed from the metal material.

16. The method of claim 12, wherein the sintering aid combination further comprises silicon.

17. The method of claim 12, comprising selecting the metal material to be a stainless steel print material or a tool steel print material.

18. A three-dimensionally printed part comprising:
- a top portion;
- a bottom portion; and
- a plurality of sequential layers arranged in a predetermined form between the top portion and the bottom portion, the plurality of sequential layers formed of a print material comprising a metal material, wherein the metal material is in the form of a powderized metal material in a powder bed or comprises a filament, and a sintering aid combination comprising boron as a first sintering aid and phosphorus as a second sintering aid in an amount effective to give the three-dimensionally printed part a density of between about 90% and about 100% after sintering.

19. The three-dimensionally printed part of claim 18, wherein the sintering aid combination further comprises silicon.

20. The three-dimensionally printed part of claim 19, wherein the print material comprises:
- boron in an amount up to about 0.4 wt % based on a weight of metal components of the metal material; and
- phosphorus in an amount up to about 1 wt % based on the weight of the metal components of the metal material.

* * * * *